US006122810A

United States Patent [19]

McInnes

[11] Patent Number: 6,122,810

[45] Date of Patent: Sep. 26, 2000

[54] VALVE CORE GRASPING APPARATUS

[76] Inventor: Robert P. McInnes, 17 Bamboo Dr., Briney Breezes, Fla. 33435

[21] Appl. No.: 09/385,429

[22] Filed: Aug. 30, 1999

[51] Int. Cl.[7] ........ B23P 19/04

[52] U.S. Cl. ........ 29/264; 29/255; 29/263

[58] Field of Search ........ 29/263, 255, 264

[56] References Cited

U.S. PATENT DOCUMENTS

| | | | |
|---|---|---|---|
| Re. 36,009 | 12/1998 | Shultz | 29/263 |
| 2,853,774 | 9/1958 | Peterson | 29/265 |
| 4,507,838 | 4/1985 | Hacker | 29/264 |
| 4,651,596 | 3/1987 | Rachanski | 29/263 |
| 4,694,569 | 9/1987 | Colvell et al. | 29/264 |
| 5,875,534 | 3/1999 | Jackson | 29/255 |

*Primary Examiner*—David A. Scherbel
*Assistant Examiner*—Lee Wilson
*Attorney, Agent, or Firm*—Alvin S. Blum

[57] ABSTRACT

Apparatus removes and replaces the valve core from the internally threaded valve stem of apparatus such as vehicular tires and air conditioning systems. Valve cores of the Shrader type have a rectangular outward projection. The device of the invention has a pair of opposed jaws that are movable toward and away from each other for removably grasping the lateral sides of the projection. The jaws are moved toward one another for grasping by a threaded rod with a tapered end that cooperates with sloping elements opposite the jaws. The jaws move away from each other for releasing the valve core by elastic bias. An optional embodiment includes a valve to enable removal and replacement of the core without the loss of fluid from the valve stem. The invention may be used to replace a valve core, or to add fluid such as refrigerant or tire sealant without interference from a valve core.

16 Claims, 3 Drawing Sheets

VALVE CORE GRASPING APPARATUS

BACKGROUND OF THE INVENTION

This invention relates to tools for fluid pressure valves, and more particularly to tools for removing and inserting Shrader type valve cores in valve stems.

DESCRIPTION OF THE PRIOR ART

Pneumatic tires are commonly inflated through a valve stem passing through, and secured to, a wheel rim of a tubeless tire. Because of the small dimension, ease of use, and low cost, the valve mechanism is incorporated into a Shrader type valve core that sealingly screws into the internal thread of the valve stem. The outwardly facing end of the valve core has a rectangular projection. When self-sealing liquids are to be introduced into the tire, the valve core must first be removed to provide a suitably large passage for the viscous liquid. Devices of the prior art employed for this purpose engage the valve core with a grappling means comprising a rod small enough to fit within the valve stem. The free end of the rod is bifurcated to present a pair of prongs defining a slot therebetween. The slot is dimensioned to snugly receive the rectangular projection of the valve core. U.S. Pat. No. 4,308,766 issued Jan. 5,1982 to Myers exemplifies apparatus of this type, and U.S. Pat. No. 3,561,090 issued Feb. 9, 1971 to Fitch discloses a valve core changing tool employed in the automotive refrigerant art. These tools grasp the core sufficiently well for applying torque for screwing and unscrewing while within the valve stem. However, when the core is past the security of the stem, the core is so poorly held by the friction of the prongs, while exposed to an escaping gas stream, that it is frequently released. It may even drop into an inaccessible location, and become contaminated. If the core is released while retracted into apparatus such as those disclosed in the above cited art, or in applicant's pending applications, Ser. No. 09/039,478 filed Apr. 16,1998, and U.S. application No. 09/263,574 filed Apr. 18, 1999, it may interfere with effective operation thereof.

It is generally desirable to be able to introduce self-sealing fluid into a tire mounted on a vehicle while the tire remains inflated. In some situations, the simplest operation involves removing the valve core and allowing a small amount of air to escape while sealing on the fluid dispenser apparatus. After fluid is pumped in, it is followed by compressed air to clear the valve stem of fluid and replace lost air. The apparatus is quickly removed, and the valve core sealingly inserted. A serious problem arises when the valve core is displaced during these rapid maneuvers in a stream of escaping compressed air.

SUMMARY OF THE INVENTION

It is accordingly an object of the invention to provide a means for securely grasping a Shrader type valve core during removal and installation in a valve stem. The apparatus of the invention comprises a long cylindrical body having, at a free end, an axial bore dimensioned for closely receiving the outer diameter of a valve stem. A pair of elongate opposed rigid tong elements is pivotally mounted within that bore so as to pivot about an axle member positioned intermediate the two end of the elements, the axle member disposed transverse to the long axis of the cylindrical body. Each element terminates in ajar end facing the free end of the body and a sloping end facing away from the free end. The opposing jaw ends are constructed to grasp the flat lateral faces of the rectangular projection of the Shrader valve core when forced toward one another. Threadedly mounted on another end of the body is a control assembly having a tapered member extending along the long axis, and arranged to cooperate with the sloping ends of the elements to force them apart when the sleeve assembly is rotated in a first direction. The sloping ends are biased by a spring or elastic means to move toward one another when the sleeve assembly is rotated in a second direction. The axle member acts as a fulcrum so that the jaw ends grasp the rectangular projection securely when the control assembly is rotated in the first direction, and release the core when rotated in the opposite direction. To operate the device, the control assembly is rotated to move the jaw ends apart. The free end of the body is pushed onto the valve stem until contact with the core is made. The body is rotated while pushing to ensure that the jaw ends are adjacent the sides of the rectangular projection of the core. The control assembly is then rotated relative to the body to firmly grasp the core. Then the body is rotated relative to the stem to unscrew the core from the stem. To install the core the procedure is followed in reverse.

These and other objects, features and advantages of the invention will become more apparent when the detailed description is studied in conjunction with the drawings, in which like reference characters indicate like elements in the various drawing figures.

DETAILED DESCRIPTION OF PREFERRED EMBODIMENTS

Figure 1:
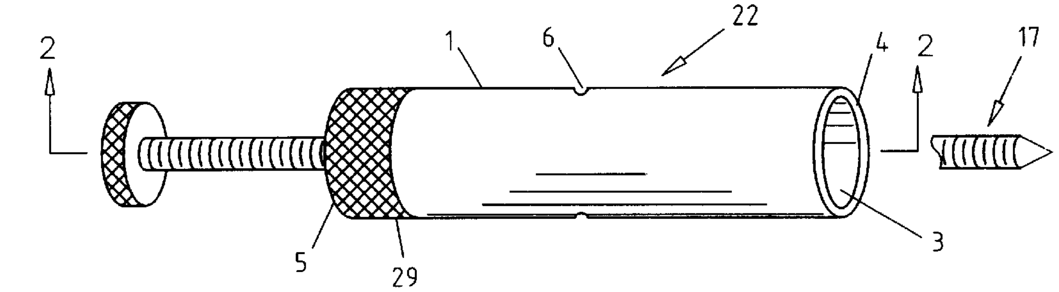
FIG. 1 is a perspective view of a device of the invention.
Figure 2:
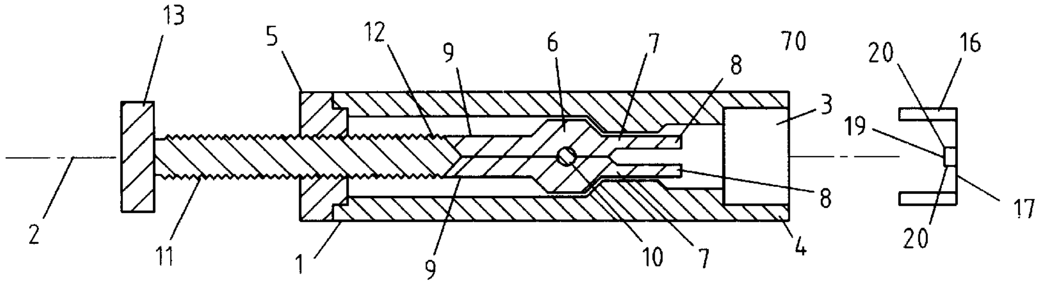
FIG. 2 is a sectional view taken through line 2—2 of FIG. 1.
Figure 3:
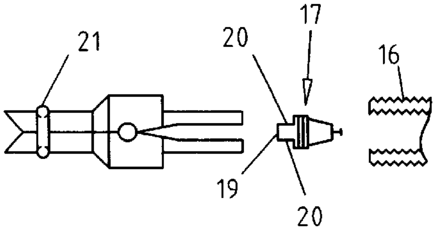
FIG. 3 is a side elevation view of a pair of the tong elements of the device of FIG. 1 with O-ring.
Figure 4:
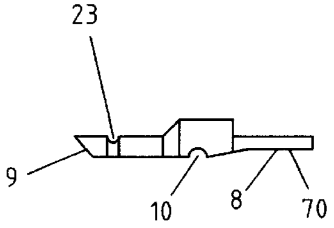
FIG. 4 is a side elevation view of one tong element of the device of FIG. 1.
Figure 5:
FIG. 5 is an end view of the element of FIG. 4.

Referring now first to FIGS. 1–5, a device 22 of the invention is shown that will be useful for removing and replacing a valve core 17 from the valve stem 16 of an automobile tire while the tire is inflated and on the rim. The need for doing this may be to replace a defective valve causing a slow leak, for example. Another reason for removing a valve core may be to inject one of the leak-preventing fluids well known in the art. These fluids cannot be effectively injected through the valve because they are viscous and would clog the valve. The device 22 comprises an elongate body 1 having a long axis 2, a free end 4, an other end 5, and an internal bore 3 dimensioned to receive therein the outer diameter of a valve stem 16. An axle member 6 is fixedly mounted within the bore 3 transverse to the long axis 2. A pair of elongate tong elements 7 each having a jaw end 8, a control end 9, and a hemi-cylindrical pivot surface 10 are pivotally mounted on the axle member 6. A bias means 21, such as an O-ring seated in groove 23, encircles the pair of tong elements and elastically forces the jaw ends apart wide enough to pass on either side of the flat lateral faces 20 of the projection 19 of the valve core 17 within the valve stem 16. An elongate control member 11 is threadedly mounted on the other end 5 of the body. It has a tapered inner end 12 and a knurled outer end 13 for rotational control. When the inner end 12 is advanced by rotation of end 13, its taper cooperates with the sloping control ends 9 to force them apart. Axle member 6 acts as a fulcrum, forcing jaws 8 together so that their opposed inner faces 70 to securely grasp the flat lateral faces 20 of the core 17. The valve core may now be unscrewed from the valve stem without fear of it being dislodged by rotating the body 1 at the knurled portion 29. The core is released by retracting the control member 11, with the O-ring forcing the jaws apart.

Figure 6:
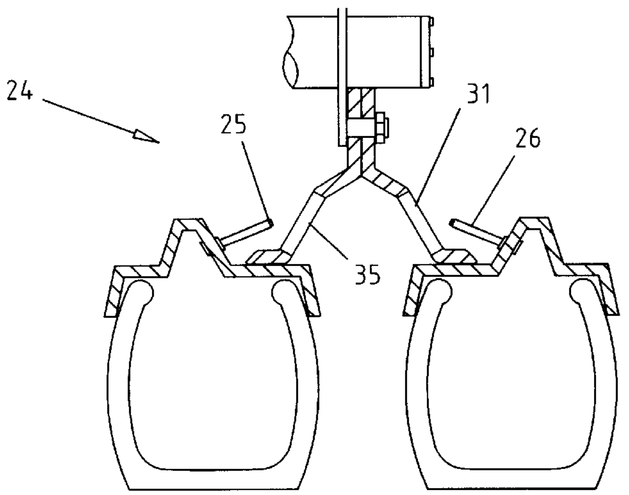
FIG. 6 is a sectional view of a conventional dual rim tire assembly.
Figure 7:
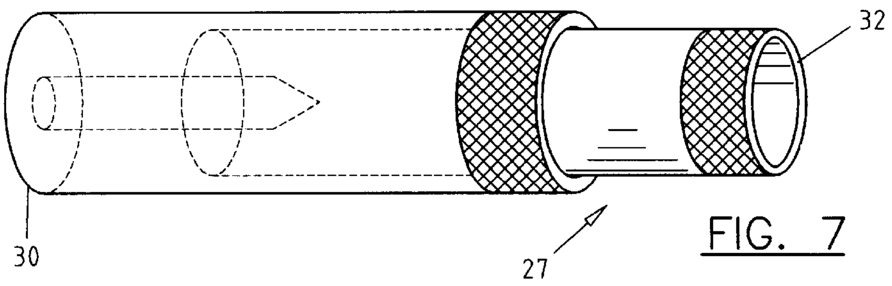
FIG. 7 is a perspective view of another embodiment of the invention for use on the valve stem of an outside tire of an assembly such as shown in FIG. 6.
Figure 8:
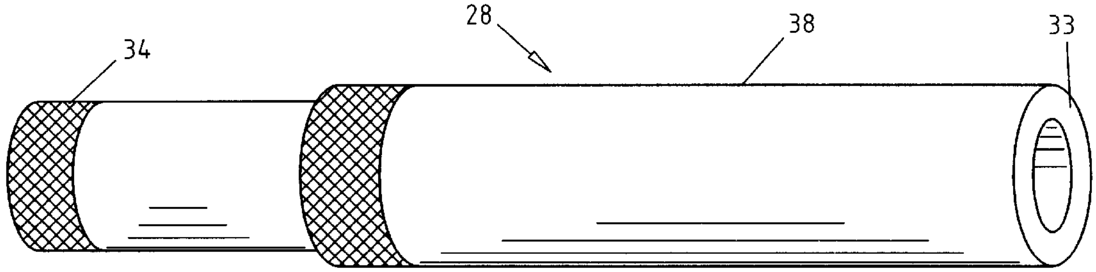
FIG. 8 is a perspective view of another embodiment of the invention for use on the valve stem of an inside tire of an assembly such as shown in FIG. 6.

Referring now to FIGS. 6–8, a conventional dual rim tire assembly 24, as found on many heavy vehicles such as trucks has inner valve stem 25, and outer valve stem 26. The valve cores within these valve stems are very difficult to access by conventional means.

FIG. 7 shows a device 27 of the invention constructed for easily accessing the core of the outer tire stem 26. The control end 30 is passed through aperture 31 of the rim until the free end 32 can be fitted over stem 26. Then the control end is rotated relative to the body to grasp the core and the body is then rotated to unscrew the core.

FIG. 8 shows a device 28 of the invention constructed for easily accessing the core of the inner tire stem 25. The free end 33 is passed through both rim apertures 31 and 35 to fit over inner stem 25. Then control member 34 is rotated relative to the body 38 to grasp the core. The body is then rotated to unscrew the core.

Figure 9:
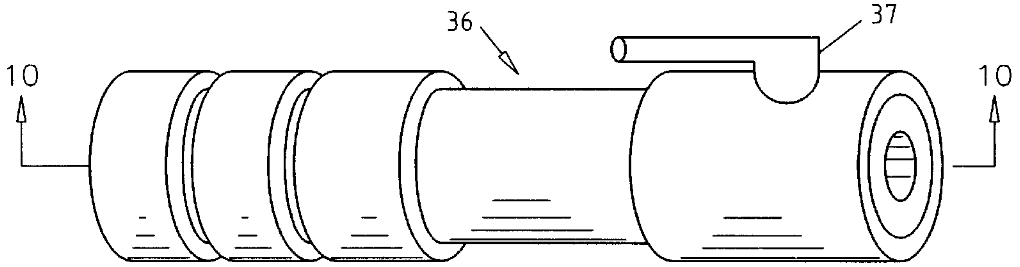
FIG. 9 is a perspective view of another embodiment of the invention suitable for use with air conditioning mechanisms.
Figure 10:
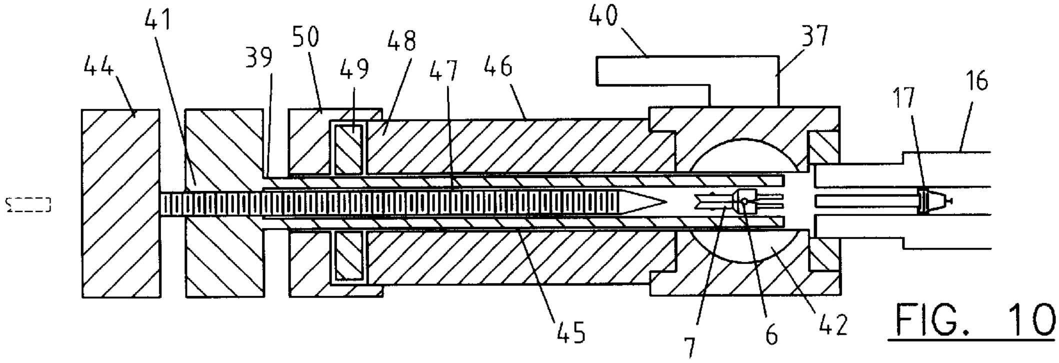
FIG. 10 is a sectional view taken through line 10—10 of FIG. 9.
Figure 13:
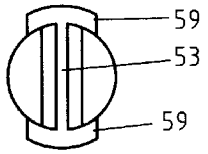
FIG. 13 is an end view of the mechanism of FIG. 11.
Figure 11:
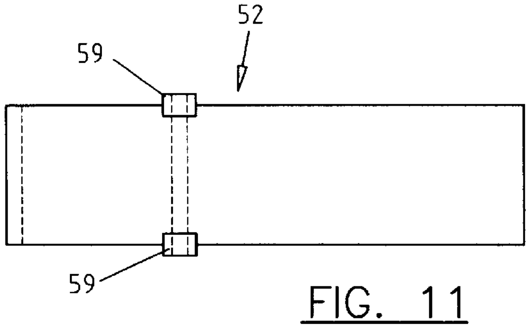
FIG. 11 is a side elevation view of a unitary tong mechanism embodiment of the invention.
Figure 15:
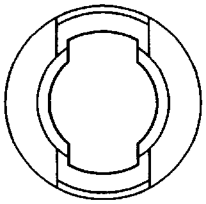
FIG. 15 is a sectional view taken on line 15—15 of FIG. 14.
Figure 12:
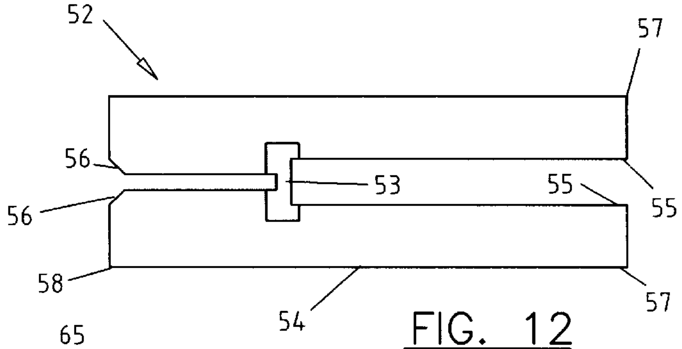
FIG. 12 is a top view of the mechanism of FIG. 11.
Figure 14:
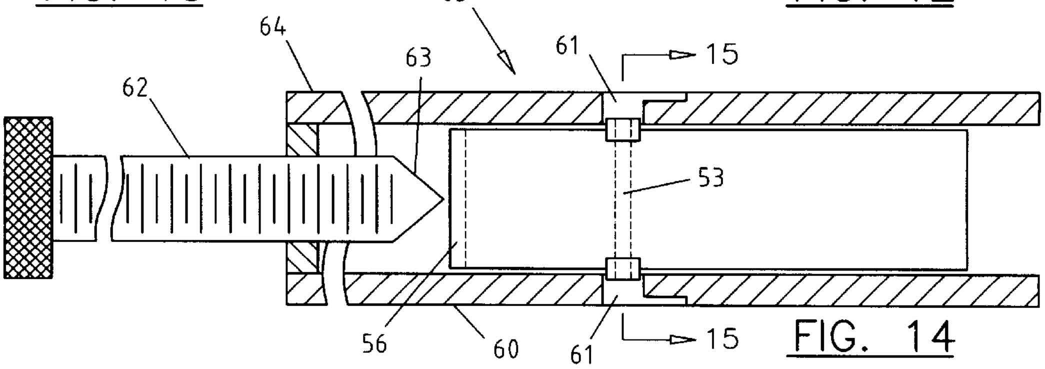
FIG. 14 is a sectional side view of a device of the invention incorporating the mechanism of FIG. 11.

Referring now to FIGS. 9 and 10, an embodiment of the invention is shown that incorporates a valve so that the core can be removed and replaced without loss of fluid from the system. This is useful when forcing viscous fluid into an inflated tire and also for work on other systems using this type of valve core, such as refrigeration systems. The device 36 of the invention operates in much the same manner as the earlier described embodiments, while also incorporating a valve 37 in the inner bore through which the core 17 may be passed. A body member 39 has an inner bore 45 in which are pivotally mounted the two tong elements 7 on transversely mounted axle member 6. A control member 44 is threadedly engaged in threaded element 46 at one end of the body and cooperates with the tong elements as described supra. This embodiment provides an outer sleeve 46 having an inner passage 47 through which the body can freely translate when the valve handle 40 is turned to the position shown in which the valve plug 42 is turned to align its passage with the bore 45 of body 39. Sleeve 46 has a free end threaded to substantially sealingly receive the threaded outside of the valve stem 16. The other end 48 of the sleeve is provided with a resilient ferrule 49 that is adjustably compressed by packing gland 50 to enable a translatory sliding seal on body 39. This enables the operator to sealingly thread the device onto a stem, open the valve, advance the body until the tongs are beside the rectangular projection of the core, turn the control member 44 until the core is securely grasped, rotate the body to unscrew the core, retract the body past the valve, and then close the valve. The body with core may now be removed from the sleeve without fluid loss. Some other device 51 such as a supply of refrigerant or tire sealant may then be inserted into the sleeve as required.

Referring now to FIGS. 11–15, another embodiment 65 of the invention is shown in which the tong mechanism 52 is formed in one piece. It may be formed of metal or plastic. The tong mechanism 52 comprises a fulcrum, axle member, or resilient bridge 53 that functions as a bias means and that connects two elongate arms 54. Each arm has ajar 55 at a first end 57 and a sloping control surface 56 at a second end 58. Two bosses 59 that anchor in the wall of body 60 at apertures 61 extend out radially past the arms. The bridge holds the jaws apart sufficiently to enable them to slide past the flat lateral sides of the projection of the valve core. An elongate control member 62 has a tapered inner end 63. Member 62 is threadedly mounted in one end 64 of the body. When the tapered end 63 is advanced by rotation in one direction, it cooperates with the sloping control surfaces 56 to force them apart against the bias of bridge 53. As ends 58 are forced apart, the jaws 55 are forced toward one another to so that their opposed inner faces securely grasp the flat lateral sides of the valve core projection. The bosses 59 ensure that the jaws will rotate with the body when it is rotated to screw or unscrew the core.

The above disclosed invention has a number of particular features which should preferably be employed in combination, although each is useful separately without departure from the scope of the invention.

While I have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. Apparatus for removing and installing a valve core that is mounted in the internal thread of a valve stem that has an external diameter, the valve core having a rectangular projection with flat lateral faces, the apparatus comprising:

A) a body having a long axis, an internal bore, a free end and an other end;

B) an axle member mounted within the internal bore transverse to the long axis and intermediate the ends;

C) a pair of elongate rigid opposed tong elements pivotally mounted within the bore on the axle member, each element having a jaw end facing the free end of the body and a control end facing away from the free end, the opposed jaw ends having opposed inner faces constructed for removably grasping the flat lateral faces of the valve core;

D) an elongate control member axially mounted on the other end of the body and having an inner end that penetrates the internal bore and cooperates with the control ends of the tong elements to force the control ends apart and the jaw ends together when the control element is advanced, and an outer end provided with rotation control features for threadedly advancing and retracting the control member; and E) bias means for elastically biasing the control ends toward one another.

2. The apparatus according to claim 1, in which the internal bore is dimensioned at the free end for closely receiving the outer diameter of the valve stem.

3. The apparatus according to claim 2, in which at least one of the inner end and the control ends is sloped.

4. The apparatus according to claim 2, in which the bias means is an O ring.

5. The apparatus according to claim 1, in which at least one of the inner end and the control ends is sloped.

6. The apparatus according to claim 1, in which the bias means is an O ring.

7. The apparatus according to claim 1 further comprising:

a) a cylindrical outer surface on the body;

b) an elongate sleeve having an inner passage coaxial with the long axis and having a first terminus with a threaded inner diameter constructed to sealingly engage the external diameter of the stem and a second terminus constructed to sealingly engage the cylindrical outer surface on the body while enabling rotational and translatory motion of the body relative to the sleeve; and c) valve means interposed between the first and second termini for closing communication between the termini in a first mode of operation, and for opening communication between the termini and for enabling passage of the jaw ends through the valve means in a second mode of operation.

8. Apparatus for removing and installing a valve core that is mounted in the internal thread of a valve stem that has an external diameter, the valve core having a rectangular projection with flat lateral faces, the apparatus comprising:

A) a body having a long axis, an internal bore a free end, and an other end;

B) a tong mechanism mounted within the internal bore intermediate the ends, the tong mechanism comprising:

1) a pair of opposed jaws facing the free end, the jaws having opposed inner faces constructed for removably grasping the flat lateral faces of the valve core when moved toward one another;

2) a control end facing away from the jaws; and 3) bias means for elastically moving the jaws apart sufficiently to pass along the flat lateral faces of the projection; and C) a threaded elongate control member axially mounted on the other end of the body and having an inner end that penetrates the internal bore and cooperates with the control end to force the jaws together when the control member is threadedly advanced.

9. The apparatus according to claim 8, in which at least one of the inner end and the control end is sloped.

10. The apparatus according to claim 8, further comprising:

a) a cylindrical outer surface on the body;

b) an elongate sleeve having an inner passage coaxial with the long axis and having a first terminus with a threaded inner diameter constructed for sealingly engaging the external diameter of the stem, and a second terminus constructed for sealingly engaging the cylindrical outer surface on the body while enabling rotational and translational motion of the body relative to the sleeve; and c) valve means interposed between the first and second termini for closing communication between the termini in a first mode of operation, and for opening communication between the termini and for enabling passage of the jaws through the valve means in a second mode of operation.

11. Apparatus for removing and installing a valve core that is mounted in the internal head of a valve stem that has an external diameter, the valve core having a rectangular projection with flat lateral faces, the apparatus comprising:

A) a body having an internal bore with a long axis, a free end, and an other end;

B) a one-piece tong mechanism mounted within the internal bore intermediate the ends, the one-piece tong mechanism comprising:

1) a pair of elongate arms having first ends with opposed jaws facing the free end, the jaws having opposed inner faces constricted for removably grasping the flat lateral faces of the valve core when moved toward one another;

2) the arms having second ends facing away from the free end, the second ends having sloping control surfaces;

3) a resilient bridge member joining the pair of elongate arms at a point intermediate their first and second ends and resiliently holding the jaws apart sufficiently to enable the jaws to pass along the flat lateral faces of the rectangular projection; and 4) lateral bosses aligned with the bridge member and extending out radially past the arms to engage apertures in the body; and C) an elongate control member axially mounted on the other end of the body and having an inner end that penetrates the internal bore and cooperates with the sloping control surfaces to force the jaws together to grasp the flat lateral faces of the valve core when the control member is advanced.

12. The apparatus according to claim 11, further comprising:

a) a cylindrical outer surface on the body;

b) an elongate sleeve having an inner passage coaxial with the long axis and having a first terminus with a threaded inner diameter constructed for sealingly engaging the external diameter of the stem, and a second terminus constructed for sealingly engaging the cylindrical outer surface on the body while enabling rotational and translational motion of the body relative to the sleeve; and c) valve means interposed between the first and second termini for closing communication between the termini in a first mode of operation, and for opening communication between the termini and for enabling passage of the jaws through the valve means in a second mode of operation.

13. The apparatus according to claim 12, in which the tong mechanism is formed of plastic.

14. The apparatus according to claim 11, in which the tong mechanism is formed of plastic.

15. The apparatus according to claim 12, in which the tong mechanism is formed of metal.

16. The apparatus according to claim 11, in which the tong mechanism is formed of metal.

* * * * *